Sept. 26, 1950　　　J. C. AUTEN　　　2,523,491
VEHICLE CONTROL

Filed Jan. 19, 1946　　　　　　　　4 Sheets-Sheet 1

INVENTOR.
Jay C. Auten
BY
Harness and Harris
ATTORNEYS.

Sept. 26, 1950 J. C. AUTEN 2,523,491
VEHICLE CONTROL
Filed Jan. 19, 1946 4 Sheets-Sheet 2
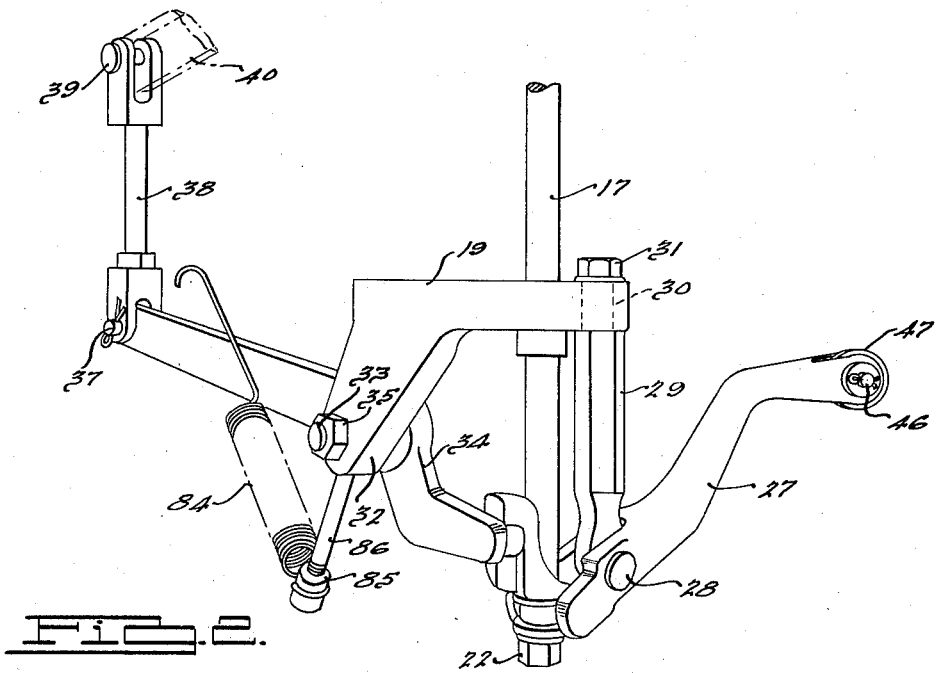
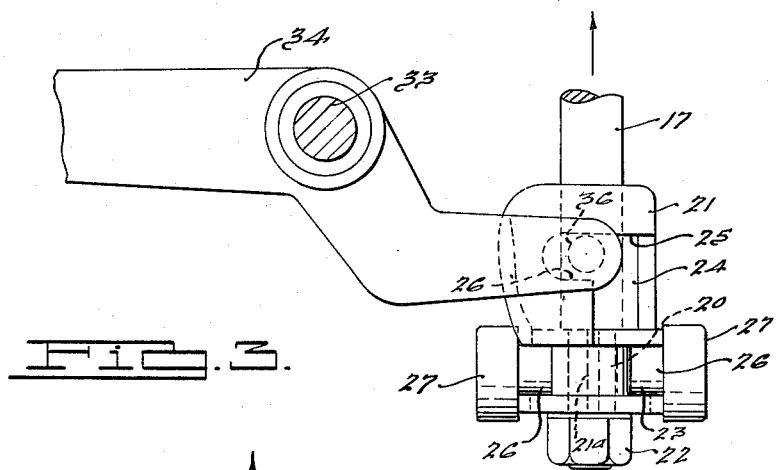
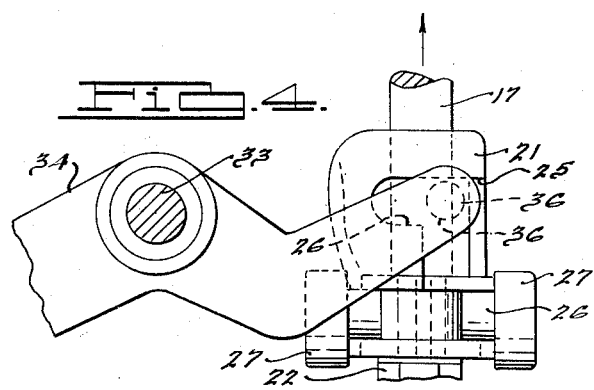
INVENTOR.
Jay C. Auten
BY Harness and Harris
ATTORNEYS.

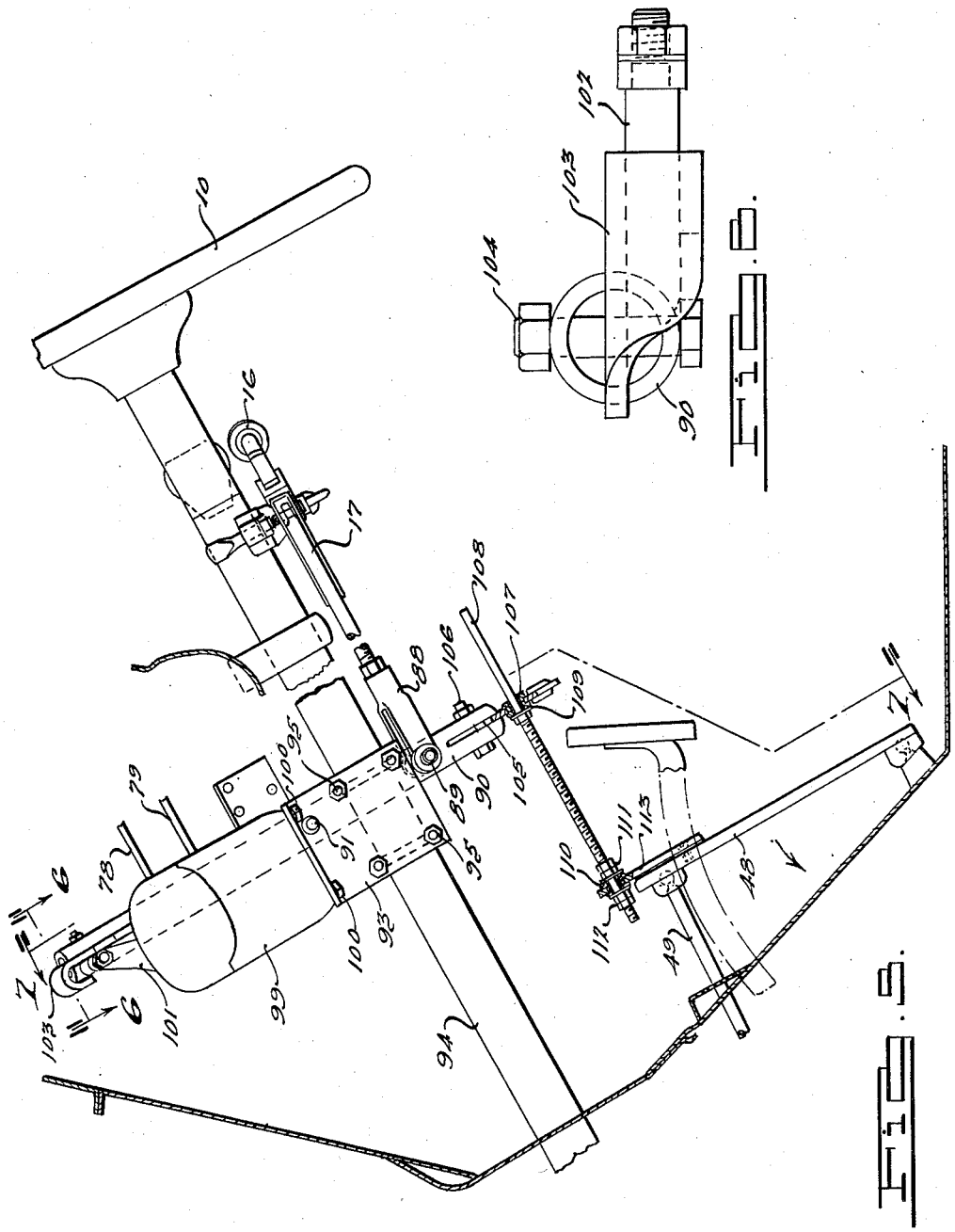

Sept. 26, 1950  J. C. AUTEN  2,523,491
VEHICLE CONTROL
Filed Jan. 19, 1946  4 Sheets-Sheet 4
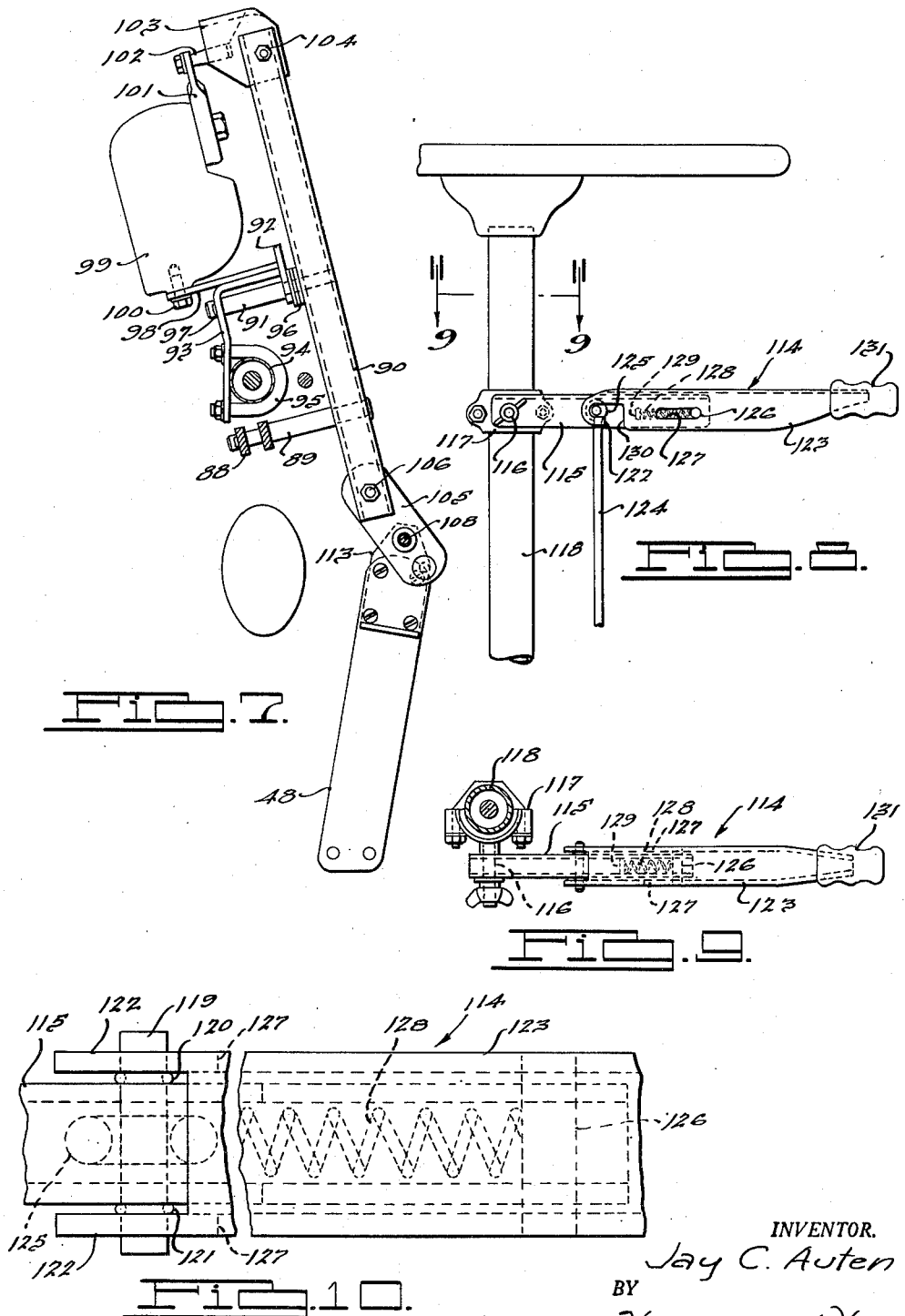
INVENTOR.
Jay C. Auten
BY
Harness and Harris
ATTORNEYS.

Patented Sept. 26, 1950

2,523,491

UNITED STATES PATENT OFFICE 2,523,491

VEHICLE CONTROL

Jay C. Auten, Royal Oak, Mich., assignor to Chrysler Corporation, Highland Park, Mich., a corporation of Delaware Application January 19, 1946, Serial No. 642,337

11 Claims. (Cl. 192—3)

This application relates to simplified controls for automobiles for the benefit of handicapped drivers.

I have discovered the desirability of coordinating the operation of two very frequently used control devices in an automobile, namely, brake and accelerator in a single actuating member so that a driver who is handicapped by the loss or disability of one or more of the separate body limbs employed in actuating the accelerator and brake may conveniently actuate both through the single member.

An object of the present invention is to provide improvements in a unitary actuating means for two separate automobile control devices such as brake and accelerator. The unitary actuating means may be supported by the steering post of the automobile.

A further object relates to improvements in a positive return to neutral or inoperative position of an automobile control device by means of a unitary means actuating not only the aforementioned control device but another control device.

Another object is to construct a unitary actuating means for a plurality of automobile control devices in such a way that it is easily adjusted so as to be out of the way of a driver who may not wish or need to use the unitary actuating means. It is intended that the unitary actuating means of the present invention may be mounted adjacent the steering post and have an operating member adjacent the steering wheel. In modern automobiles the transmission shift member is mounted in about this position, and the proximity of transmission shift member and the operating member of the unitary actuating means might bring considerable confusion to a driver who did not require the special unitary actuating means and might therefore be unacquainted with it. I have therefore, made arrangements for simply and easily moving the operating member of the unitary actuating means out of the way.

Other objects will appear from the disclosure.

In the drawings:

Fig. 2 is a perspective view of a portion of the unitary actuating means of Fig. 1;

Fig. 3 is an elevational view of a part of the structure of Fig. 2 in one position;

Fig. 4 is a similar view of the part of the structure in a different position;

Fig. 5 is a view partially in section of a modified form of unitary actuating means;

Fig. 6 is an end view of a portion of the means of Fig. 5, taken on the line 6—6 of Fig. 5;

Fig. 7 is a sectional view taken on the line 7—7 of Fig. 5;

Fig. 8 is an elevational view showing a novel lever forming part of the unitary actuating means of the present invention;

Fig. 9 is a sectional view taken on the line 9—9 of Fig. 8; and

Fig. 10 is an enlarged view of a portion of the structure shown in Fig. 9.

Figure 1:
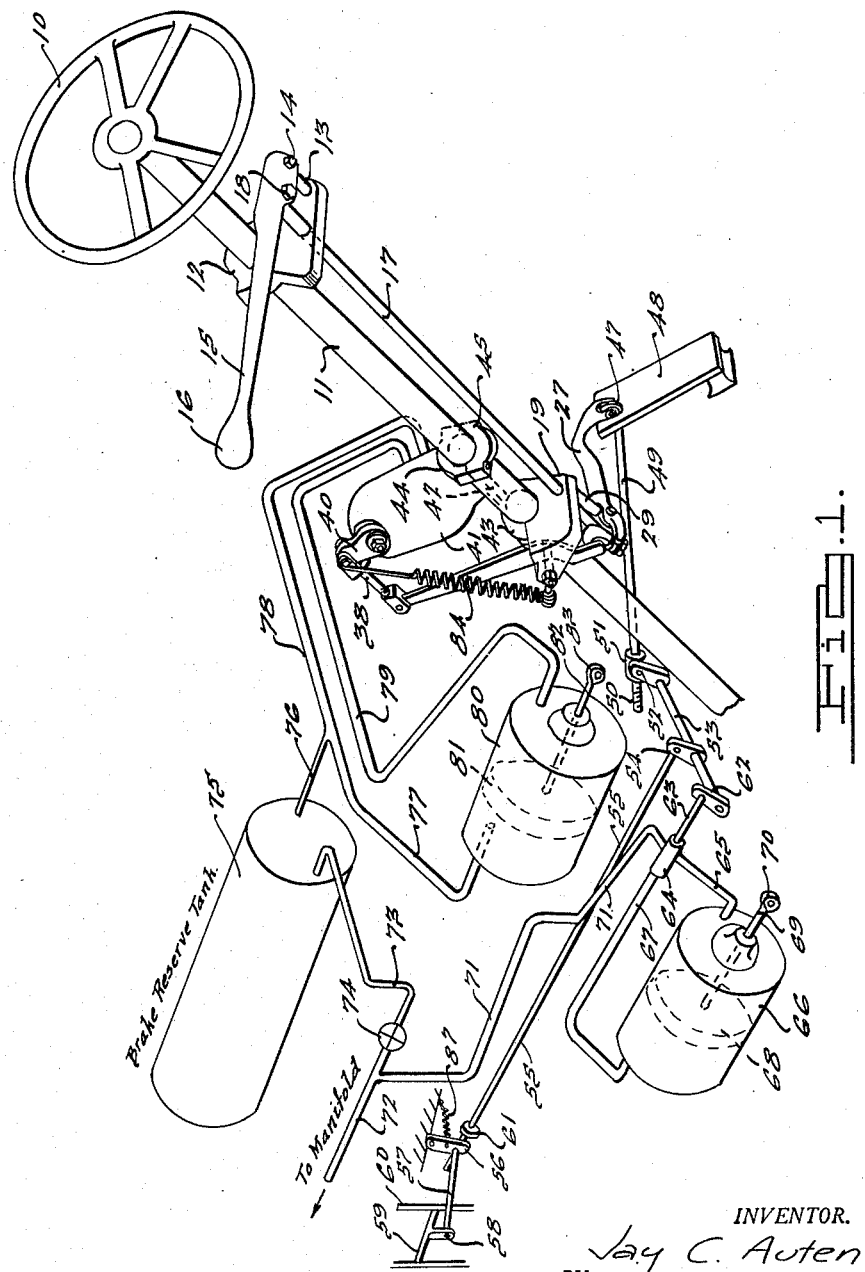
Fig. 1 is a partially perspective and partially diagrammatic view of operating mechanisms of various control devices for an automotive vehicle and a unitary actuating means therefor.

As seen in Fig. 1, reference character 10 designates a steering wheel positioned at the upper end of a steering post 11. A bracket 12 is secured to the steering post and carries an upstanding member 13 to which is pivotally connected by means of a screw 14 an operating lever 15. One end of the operating lever is pivotally connected to the upstanding member 13 and the other end of the lever has a handle portion 16. The upper end of an actuating rod 17 is pivotally connected by means of a screw 18 to the operating lever 15 at a region adjacent the upstanding member 13. The upper end of the actuating rod 17 is slidably guided in bracket 12, and the lower end of the rod is slidably guided in the bracket 19. As seen in Fig. 3, the lower end of the actuating rod 17 has a reduced portion 20 upon which is mounted a casting 21. The casting is keyed on the reduced portion 20 as indicated at 21ª. Nut 22 retains the casting on the reduced portion. The casting has a circumferential groove 23 and an axial recess 24 terminating at its upper end in a shoulder 25 and being connected to a short transverse recess 26. The circumferential groove 23 is engaged by inwardly directed projections 26 formed on a bifurcated end of a lever 27 pivoted by pin 28 adjacent the bifurcated end upon a depending member 29 secured to the bracket 19. A reduced portion 30 on the depending member 29 extends through the bracket 19 and carries a nut 31 securing the member 29 to the bracket 19. The bracket 19 has a depending portion 32 on which is pivotally mounted by means of a bolt 33 a lever 34. A nut 35 holds the bolt and lever on the bracket 19. As seen in Figs. 3 and 4, one end of the lever 34 is of bellcrank shape and is provided with a projection 36 fitting into the transverse recess 26 as in Fig. 3, or moving along the axial recess 24. The other end of the lever 34 is pivotally connected by a pin 37 to the lower bifurcated end of a link 38. The upper bifurcated end of the link 38 is pivotally connected by a pin 39 to a lever 40 connected to a control valve, not shown, contained within a housing 41. The housing 41 is attached to a part 42 having at its lower end a portion 43 forming part of the bracket 19 and at its upper end a portion 44 forming with a member 45 a collar clamped to the steering post 11.

The lever 27 carries at its outer end by means of a pin 46 a roller 47 engaging an accelerator pedal 48. One end of a rod 49 is connected to the under side of the pedal 48 and the other end of the rod 49 has adjustably connected thereto on a threaded portion 50 a nut 51. To the nut 51 is connected an arm 52 fixed to a rockshaft 53. An arm 54 is also fixed to the rockshaft 53 and is pivotally connected to one end of a rod 55, the other end of which is slidably received in a pivoted member 56. A link 57 connects the pivoted member 46 with an arm portion 58 attached to a throttle valve 59 in an intake line 60 leading to an engine, not shown. A collar 61 fixed near the end of the rod 55 causes leftward movement of the rod 55, as viewed in Fig. 1, to be first without effect upon the throttle valve 59 and thereafter to open the throttle valve.

An arm 62 is fixed to one end of the rockshaft 53 and to the arm is connected a valve member 63 slidably fitting within a complementary valve member 64. A line 65 leads from the valve member 64 to one side of a vacuum cylinder 66. A line 67 leads from an end of the valve member 64 to the other end of the vacuum cylinder 66. Positioned within the cylinder 66 is a piston. A rod 69 is connected to the piston 68 and projects outwardly of the vacuum cylinder 66, terminating in an eye portion 70. To the eye portion is connected means, not shown, for operating a clutch pedal, and this means will include a spring urging the piston 68 and rod 69 to the right, as viewed in Fig. 1, thereby moving the clutch to an engaged position. A vacuum line 71 is connected to the valve part 64. The arrangement is such that when the valve part 63 is positioned in a certain way with respect to the valve part 64 by the arm 62, the vacuum line 71 is connected to the line 67 so as to supply vacuum to the left end of the cylinder 66. The vacuum on the left end of the cylinder acts against the aforementioned spring to disengage the clutch. The line is associated with the valve part 64 so as continuously to supply atmospheric air pressure to the right end of the cylinder 66. When the clutch is to be engaged, the valve part 63 is shifted with respect to the valve part 64 by the arm 62 so that the vacuum line 71 is disconnected from the line 67, and atmospheric air pressure is supplied thereto. This causes atmospheric air pressure to act against the left end of the piston 68, and the piston and rod 69 are urged to the right as viewed in Fig. 1, under the action of the spring so as to bring about engagement of the clutch. The vacuum line 71 is connected to another vacuum line 72 leading to the engine manifold, as indicated, which is the source of vacuum. To the line 72 is also connected a line 73 having therein a valve 74 and leading to a tank 75, which acts as a vacuum storage chamber for the brake. A line 76 leads from the tank 75 and branches into two lines 77 and 78. The line 78 leads to the valve housing 41. From the housing 41 a line 79 leads to one end of a vacuum cylinder 80. The line 77 is connected with the other end of the vacuum cylinder. A piston 81 is positioned within the cylinder 80, and a rod 82, attached to the piston 81, extends outwardly of the cylinder 80, terminating in an eye portion 83. The eye portion is connected by means, not shown, to a brake. These means will include a spring urging the piston 81 and rod 82 to the right as seen in Fig. 1, and thereby the brake is released. When the arm 40 is in the position of Fig. 1, the valve parts within the valve housing 41 are so positioned with respect to one another that the lines 78 and 79 are connected, and thus the vacuum urging line 78 from the reserve tank 75 by way of the line 76, acts through the line 79 and against the right end of the piston 81. Thus vacuum acts against both sides of the piston 81 and the brake is under the control of the spring just mentioned and not shown, and is released. However, when the arm 40 is moved clockwise from the position of Fig. 1, the line 79 is disconnected from the line 78 and is connected to atmospheric air pressure, which acts against the right end of the piston 81 causing it to move to the left, as viewed in Fig. 1, against the action of the spring. Thus the brake is applied.

Let us now consider the relation of the operating lever 15 to the various devices just described.

The lever 15 may be moved either upwardly toward the vehicle operator or downwardly away from the vehicle operator. These actions will result, respectively, in axial movement of the actuating rod 17 along the steering post 11 in a direction upwardly and toward the operator and downwardly and away from the operator. Downward movement of the operating lever 15 and the actuating rod 17 is intended to act through the vacuum cylinder 80 to apply the brake. This is brought about in the following manner as may be seen from Figs. 2, 3, and 4. As the rod 17 moves downwardly, the shoulder 25 on the casting 21 engages the projection 36 on the lever 34, and the lever 34 moves in a clockwise direction and the projection 36 shifts into the transverse recess 26, as seen in Fig. 3. The aforementioned clockwise movement of the lever 34 causes upward movement of the connecting link 38 and clockwise movement of the arm 40 on the valve housing 41. As previously described, this causes a disconnection of the line 79 from the line 78 and the supplying of atmospheric air through the line 79 to the right side of the piston 81. Leftward movement of the piston 81 and the rod 82 results against the action of the spring not shown, and the brake is applied. If the operating lever 15 is depressed sufficiently, the arm 40 moves far enough in a clockwise direction to bring into an overcenter position a spring 84 connected at one end to the pin 39 and at the other end to a sleeve 85 threaded on a member 86 projecting downwardly in a fixed position from the bracket 19. In this way the brake is kept applied without a continuous holding down of the operating lever 15 by the vehicle operator. When the brake is to be released from this condition, the operating lever is raised to take the spring 84 out of overcenter position. Upward movement of the operating lever 15 positively returns the arm 40 on the valve housing 41 to its original position, because, as the actuating rod 17 moves upwardly the projection 36 on the operating lever 34, being positioned in the transverse recess 26 in the casting 21, is engaged by the lower side of the transverse recess 26. However, when the operating lever 15 has moved upwardly to its original neutral position, the projection 36 will have moved not only upwardly, but also to the right so as to be out of the transverse recess 26. This may be seen from Fig. 4. Thereafter further upward movement of the actuating rod 17 may take place without effect upon the lever 34 and the arm 40 on the valve housing 41.

When the operating lever is moved upwardly from its neutral position, the casting 21 attached to the lower end of the actuating rod 17 also moves upwardly, causing upward movement of the left end of the lever 27, as viewed in Fig. 2, by virtue of the engagement of the projections 26 on the left end of the lever 27 with the circumferential groove 23 in the casting 21. Thereby downward movement of the right end of the lever 27 is brought about, and the roller 47 on the lever 27 moves into engagement with the accelerator pedal 48, causing it to be depressed. The link 49, connected to the accelerator pedal 48, is moved to the left, as viewed in Fig. 1, and causes counterclockwise movement of the arm 52 attached to the rockshaft 53. The resultant counterclockwise movement of the rockshaft 53 produces counterclockwise movement of the arms 54 and 62. This brings about a leftward movement of the valve part 63 with respect to the valve part 64, and as previously described, the line 67 is disconnected from the vacuum line 71 and is connected to atmospheric air. Thus the atmospheric air acts against the left end of the piston 68, causing it and the rod 69 to be moved to the right against the action of the spring associated with the clutch, and the clutch becomes engaged. The opening of the throttle valve 59 beyond the idle position shown in Fig. 1 is delayed until the engagement of the clutch has taken place, because of the lost motion connection between the throttle valve 59 and the arm 54 involved in the collar 61 on the rod 55 and the depending arm 56. As seen in Fig. 1, the link 55 must move a certain amount to the left before engagement of the collar 61 with the arm 56 takes place. Thereafter further leftward movement of the link 55 causes the opening of the throttle valve 59 to be increased from the idle position. Downward movement of the operating lever 15 to the original neutral position causes disengagement of the clutch and return of the throttle valve 59 to the idle position of Fig. 1. The actuating rod 17 moves downwardly, causing downward movement of the left end of the lever 27 and upward movement of the right end of the lever. As the roller 47 moves upwardly, the accelerator pedal 48 also moves upwardly under the action of a spring not shown. This causes rightward movement of the link 49 as seen in Fig. 1, and clockwise movement of the rockshaft 53 and the arms 52, 54 and 62 attached thereto. As a result, the valve part 63 is moved to the right, and the line 67 is connected to the vacuum line 71 causing vacuum to be supplied against the left end of the piston 68. This brings about a leftward movement of the piston 68 and the rod 69 against the action of the spring associated with the clutch, and the clutch is disengaged. Also as a result, the link 55 and the collar 61 mounted thereon moved to the right, allowing the depending arm 56 to move in a counterclockwise direction, under the action of a spring 87, and a depending arm 56 acts through the link 57 and the arm 58 to move the throttle valve 59 to the idle position of Fig. 1.

From the foregoing description it will be seen that I have provided a unitary means in the form of the operating lever 15 and the various parts associated therewith for actuating on the one hand the brake, and on the other hand the clutch and the accelerator or the fuel supplying means. The operating lever 15 works through movement toward and away from the vehicle operator. These movements can be performed quite easily by a handicapped person who, for example, may have a mechanical appliance substituted for a hand. By means of the mechanical appliance he can readily grasp the operating lever 15 and work it up and down as may be required for actuation of the various control devices on the vehicle such as brake, clutch, and accelerator.

Figs. 5, 6, and 7 show modified means by which up and down movement of the operating lever 15 and the actuating rod 17 are communicated to the brake, clutch, and accelerator for actuation thereof. The lower end of the actuating rod 17 carries a clevis 88 which is connected to a member 89 fixed to and projecting laterally from a hollow tube 90, which constitutes a lever. The tube or lever is pivoted at an intermediate region by means of a member 91 fixed thereto and projecting therefrom. The member 91 extends through a piece 92 and a bent element 93 secured to the steering post 94 by means of U-bolts 95. The tube or lever 90 is spaced from the part 92 by means of washers 96 and the member 91 is retained in the piece 92 and the bent element 93 by means of a cotter pin 97. The plate 98 is suitably secured to the bent member 93 and supports a valve housing 99 by means of screws 100. An arm 101 is mounted on the valve housing 99 and carries a laterally projecting member 102 adapted to be engaged by a hook-shaped part 103. The part 103 fits in a slot in one end of the tube or lever 90 and is secured thereto by means of a bolt and nut 104. A plate 105 fits in a slot in the other end of the tube 90 and is secured thereto by means of a bolt and nut 106. The plate 105 carries a bushing 107 in which is slidably positioned a threaded rod 108. A nut 109 adjustably mounted on the threaded rod 108, engages the under side of the bushing 107, as shown in Fig. 5. The lower end of the threaded rod 108 carries a bushing 110 positioned on the rod by means of pairs of nuts 111 and 112. The bushing 110 is attached to an extension piece 113 riveted to the accelerator pedal 48. The rod 49 extends from the under side of the accelerator pedal 48 in a manner not shown in Fig. 5 so as to be operatively connected to the various devices shown in Fig. 1, in the manner shown in that figure. Lines 78 and 79 are connected to the valve housing 99 in the manner of the lines 78 and 79 of Fig. 1. Line 78 will be continuously connected either to the previously mentioned vacuum line or to atmospheric air pressure. When the arm 101 mounted on the valve housing 99 is positioned as shown in Fig. 5, lines 78 and 79 will be connected to one another so that the brake is released. When the brake is to be applied, the arm 101 is moved in counterclockwise direction from the position of Fig. 5 in order to connect the line 79 to atmospheric air. The required counterclockwise movement of the arm 101 will be brought about by counterclockwise movement of the tube or lever 90 or in other words, leftward movement, as viewed in Fig. 5, of the hook-shaped element 103 attached to the lever 90. As the arm 101 moves in a counterclockwise direction, it enters the hook 103. Thus when the lever 90 is returned to its original position through clockwise movement or in other words, when movement to the right, as viewed in Fig. 5, of the hook-shaped element 103 takes place, the engagement of the projecting member 102 on the arm 101 with the hook brings about a clockwise movement of the arm 101 to its original position, When this occurs, the lines 78 and 79 are again connected to one another, and vacuum is supplied to both ends of the vacuum cylinder for the brake, and the brake is released. The aforementioned actuation of the brake will be brought about by upward movement of the actuating rod 17. If the operating lever therefor is connected to the actuating rod in the manner of Fig. 1, then actuation of the brake will require an upward movement of the operating lever. However, the operating lever may be pivotally mounted at an intermediate region with the actuating rod connected at one end and the handle portion at the other end, and the brake may then be actuated by downward movement of the handle end of the operating lever.

Depression of the accelerator pedal 48 required for engagement of the clutch and opening of the throttle valve will take place as a result of leftward movement of the end of the tube or lever 90 to which the plate 105 is connected. The plate 105 acts through the bushing 107 and the nut 109 to shift the threaded rod 108 to the left, as viewed in Fig. 5. This movement is communicated to the accelerator pedal 48 through the bushing 110, the nuts 111, and the extension piece 113. Depression of the accelerator pedal 48 is brought about by downward movement of the actuating rod 17 through appropriate movement of the operating lever. When the operating lever is returned to neutral position the bushing 107 of the plate 105 moves away from the nut 109 on the rod 108, but appropriate spring means, not shown, cause the accelerator pedal 48 to rise and to make the nut 109 on the rod 108 follow the bushing 107 and the plate 105 as far as closed throttle position.

As aforementioned, rightward movement of the hook-shaped element 103 to its original neutral position will by an engagement of the hook with the projecting member 102 carried by the arm 101 bring about the return of the arm 101 to its neutral position of Fig. 5. However, further movement of the hook-shaped element 103 to the right, occurring as a result of movement to the left of the plate 105 for depression of the accelerator pedal 48, will have no effect upon the arm 101 since the projecting member 102 on the arm 101 has moved out of engagement with the hook-shaped element 103.

Figs. 8, 9, and 10 show a modified form of operating lever, which is designated generally by the reference character 114. This lever comprises two parts adjustably connected to one another so that the parts may have one relative position with respect to one another for operation and use of the lever and may have another relative position when the lever is not to be used and should, therefore, be out of the way. One lever part 115 is formed of a channel and is pivotally connected at one end to a member 116 supported on a bracket 117 attached to a steering column 118. As seen in Fig. 10, the lever part 115 carries at an intermediate region a pin 119 which projects through the sides of the channel and extends outwardly beyond the sides of the channel. It is retained against disengagement from the lever part 115 by means of rings 120 and 121 fitting in the grooves in the pin 119 and engaging the outer sides of the channel. The pin 119 is engaged by hook portions 122 formed on the sides at one end of a channel comprising a second lever part 123. The upper end of an actuating rod 124 similar in its function to the actuating rod 17 of Fig. 1 has an eye portion 125 through which the pin 119 extends and thereby connects the actuating rod 124 to the lever parts 115 and 122. A pin 126 is secured to an intermediate portion of the legs of the channel of the lever part 114 and extends between the legs through elongated slots 127 formed in one end of the legs of the channel of the lever part 115. A spring 128 engaged at one end by a part 129 secured in the channel of the lever part 115 and at the other end by the pin 126 acts to maintain the pin 126 at the right end of the slots 127 as viewed in Figs. 8, 9, and 10. The right end of the lever part 123 has attached thereto a handle member 131. The lever 114 is moved up or down in the usual way in the manner of the lever 15 of Fig. 1. The lever may be made to take up less space through a change in the position of the lever part 123 with respect to the lever part 115. This is accomplished by an axial movement of the lever part 123 to the left, as viewed in Figs. 8, 9, and 10 until a shoulder 130 formed in each side of the channel of the lever part 123 contacts the pin 119 and thereafter by a swinging of the lever part 123 in a clockwise direction, as viewed in Fig. 8 about the pin 126 as a pivot axis. The lever part 123 now extends parallel to the actuating rod 124 and the steering column 118 and the lever 114 is out of the way to the extent that it does not extend to the right beyond the pin 126.

I claim:

1. In an automotive vehicle comprising a steering post, a steering wheel at one end thereof, an engine, brake control means, and means for feeding fuel to the engine, the combination therewith of an actuating rod parallel to and adjacent the steering post, a first bracket secured to the steering post and slidably receiving the lower end of the actuating rod, a first lever pivoted between its ends on the first bracket and having one end engageable with the lower end of the actuating rod and the other end associable with the fuel-feeding means, a second lever pivoted between its ends and having one end engageable with the lower end of the actuating rod and the other end associable with the brake control means, a second bracket secured to the steering post below the steering wheel and slidably receiving the upper end of the actuating rod, and a third lever pivoted at one end on the second bracket and connected at an intermediate point to the upper end of the actuating rod for causing axial movement of the actuating rod parallel to the steering post in one direction to make the second lever actuate the brake control means and corresponding movement of the actuating rod in the opposite direction to make the first lever actuate the fuel-feeding means.

2. The combination specified in claim 1, movement of the actuating rod toward the steering wheel causing actuation of the fuel-feeding means, and movement of the actuating rod away from the steering wheel causing actuation of the brake control means.

3. In an automotive vehicle having a steering post, brake control means, an engine, and an accelerator pedal, the combination therewith of an axially shiftable rod positioned adjacent and parallel to the steering post, a bracket attached to the steering post and slidably supporting the rod, a member attached to the rod and having a groove, a first lever pivoted between its ends on the bracket and having one end in straddling engagement with the member and the other end engageable with the accelerator pedal, a second lever pivoted between its ends on the bracket and having one end operatively connected to the brake control means and the other end engageable with the groove, whereby axial movement of the rod in one direction from a neutral position will cause the first lever to depress the accelerator pedal for increasing the flow of fuel to the engine, and axial movement of the rod in the opposite direction from the neutral position will cause the second lever to actuate the brake control means, the said other end of the second lever remaining engaged with the groove in the member during return of the rod in the said one direction to the neutral position and only so far as the neutral position.

4. In an automotive vehicle comprising a steering post, brake control means, an engine, and an accelerator, the combination therewith of an axially shiftable rod positioned adjacent and parallel to the steering post, a lever pivotally mounted between its ends, means connecting one end of the rod with the lever at a region spaced from its pivotal mounting, means associating one end of the lever with the accelerator, and means associating the other end of the lever with the brake control means, operating means connected with the other end of the control rod for causing axial movement of the rod in one direction to make the said one end of the lever depress the accelerator for increasing the flow of fuel to the engine and axial movement of the rod in the opposite direction to make the said other end of the lever actuate the brake control means.

5. In the automotive vehicle specified in claim 4, the said other end of the lever being formed in a hook engaging the brake control means upon movement of the control rod in the said opposite direction and movement in the said one direction to a certain point at which the hook becomes disengaged from the brake control means permitting further movement of the actuating rod in the said one direction without corresponding movement of the brake control means.

6. Means for axially shifting an actuating rod, comprising a first lever part, means forming a pivot mounting for one end of the first lever part, means connecting one end of the rod to an intermediate region of the first lever part, a second lever part having a portion at one end engaging the means connecting the rod and the said first lever part and a handle portion at the other end, means associated with an intermediate portion of the second lever part and slidably carrying the other end of the first lever part, and resilient means acting between the last mentioned means and the first lever part to urge the said one end of the second lever part away from the said one end of the first lever part and to maintain the said one end of the second lever part in engagement with the means connecting the rod and the first lever part for keeping the lever parts generally aligned in operative position, the second lever part being moved to an inoperative position in which it extends at a substantial angle to the first lever part by being shifted axially along the first lever part against the resilient means to disengage the said one end of the second lever part from the means connecting the rod and the first lever part and by thereafter being swung about the means slidably carrying the said other end of the first lever part on the intermediate region of the second lever part as a pivot.

7. Means for axially shifting an actuating rod, comprising a first lever part, means forming a pivot mounting for one end of the first lever part, means connecting the actuating rod to an intermediate region of the first lever part, a second lever part having one end releasably engaging an intermediate region of the first lever part and a handle portion at the other end, means providing a sliding and pivotal connection between the other end of the first lever part and an intermediate region of the second lever part, and means acting between the lever parts to urge the said one end of the second lever part away from the first lever part for causing the engagement of the said one end of the second lever part and the intermediate region of the first lever part and the pivotal and sliding connection between the said other end of the first lever part and the intermediate region of the second lever part to maintain the lever parts aligned in operative position, the second lever part being moved to an inoperative position in which its extends at a substantial angle to the first lever part by being shifted axially along the first lever part in a direction involving movement of the said one end of the second lever part toward the said one end of the first lever part for disengaging the said one end of the second lever part from the intermediate region of the first lever part, and by thereafter being swung about the sliding and pivotal connection between the said other end of the first lever part and the intermediate region of the second lever part.

8. Means for axially shifting an actuating rod, comprising a first lever part, means forming a pivot mounting for one end of the first lever part, means connecting the actuating rod to an intermediate region of the first lever part, projections positioned at opposite sides of the exterior of an intermediate region of the first lever part, a second lever part formed as a channel embracing the first lever part and having at one end the sides of the channel formed as hooks engaging the projection on the first lever part and the other end formed as a handle portion, pivotally connecting the other end of the first lever part with an intermediate region of the second lever part, resilient means acting between the lever parts to maintain engagement between the projections on the first lever part and the hooks on the second lever part for causing the lever parts to be in general alignment and thereby to be combined as an operative lever, the second lever part being moved to an inoperative position in which it extends at a substantial angle to the first lever part by being shifted axially along the first lever part to disengage the hooks from the projections, and by thereafter being swung about the slidable and pivotal connection between the intermediate region of the second lever part and the said other end of the first lever part.

9. Means for shifting an actuating rod comprising a first lever part formed as a channel, means forming a pivot mounting for one end of the first lever part, a pin projecting through and beyond the legs of the channel of the first lever part at an intermediate region and through an end of the actuating rod extending into the channel of the first lever part, a second lever part formed as a channel embracing the first lever part and having at one end the sides of the channel formed as hooks engaging the ends of the pin projecting beyond the sides of the channel of the first lever part, the other end of the second lever part providing a handle portion, the other end of the first lever part having elongated longitudinal slots in the sides of the channel, a member attached to the legs of the channel of the second lever part and projecting through the slots in the first lever, and resilient means acting between the first lever part and the member to maintain the hooks on the second lever part in engagement with the ends of the pin and the member at one end of the slots in the first lever part for causing the lever parts to extend generally in the same direction in operative position, the second lever part being moved to an inoperative position in which it extends at a substantial angle to the first lever part by being shifted axially along the first lever part to disengage the hooks from the pin, and by thereafter being swung about the connection between the lever parts provided by the member and the slots.

10. In combination, an axially shiftable rod, and a lever having a mounting portion at a location thereon and being pivotally supported to swing about a point spaced from said location, said rod being positively mounted to said mounting portion to be carried thereon for axially shifting the same, the lever being formed in a pair of adjustably connected parts extending generally in alignment and transversely to the rod in operative position, one lever part being adapted to extend in generally parallel spacing to the rod in inoperative position.

11. In combination, an axially shiftable rod, and a lever connected to the rod for shifting the same, the lever being formed of a first lever part pivotally mounted at one end for swinging movement and connected at an intermediate region to one end of the rod and a second lever part having one end detachably connected to the first lever part at the connection of the rod, the other end formed as a handle portion, and an intermediate region slidably and pivotally connected to the other end of the first lever part, the lever parts in operative position extending in general alignment transversely to the rod, the lever being made inoperative through movement of the second lever part to a position in which it extends in generally parallel spacing to the rod, said movement being carried out by shifting of the second lever part along the first lever part for disengaging the said one end of the second lever part from the intermediate region of the first lever part, and by thereafter swinging the second lever part about the connection between the said other end of the first lever part and the intermediate region of the second lever part.

JAY C. AUTEN.

REFERENCES CITED

The following references are of record in the file of this patent:

UNITED STATES PATENTS

| Number | Name | Date |
|---|---|---|
| 455,728 | Norton | July 7, 1891 |
| 602,621 | Grant | Apr. 19, 1898 |
| 890,565 | King | June 9, 1908 |
| 905,637 | Beskow | Dec. 1, 1908 |
| 1,403,390 | Cameron | Jan. 10, 1922 |
| 2,016,308 | Wyllie | Oct. 8, 1935 |
| 2,212,904 | Stone | Aug. 27, 1940 |